No. 660,164. Patented Oct. 23, 1900.
J. NAGELDINGER.
APPARATUS FOR DRAWING EFFERVESCENT LIQUIDS.
(Application filed Mar. 1, 1899.)
(No Model.) 3 Sheets—Sheet 2.
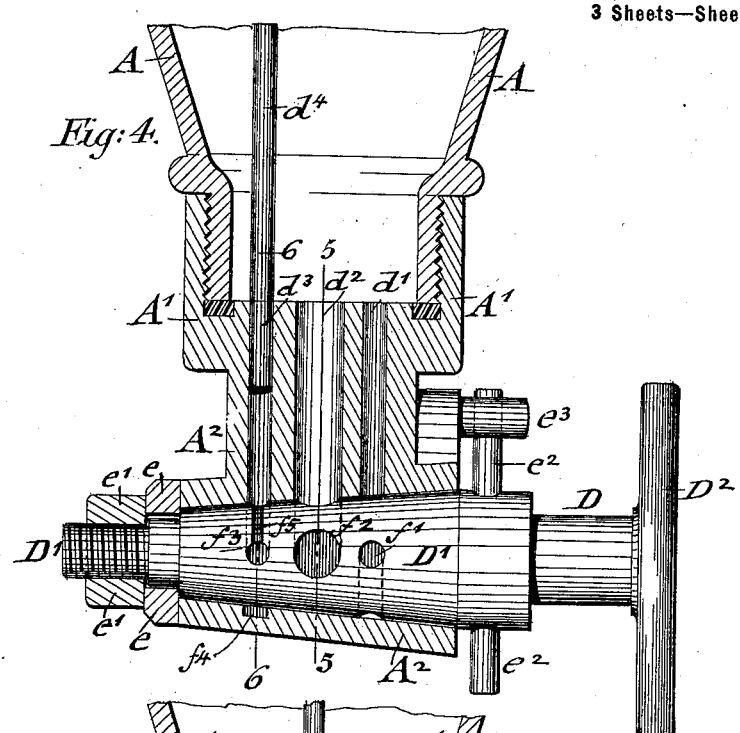
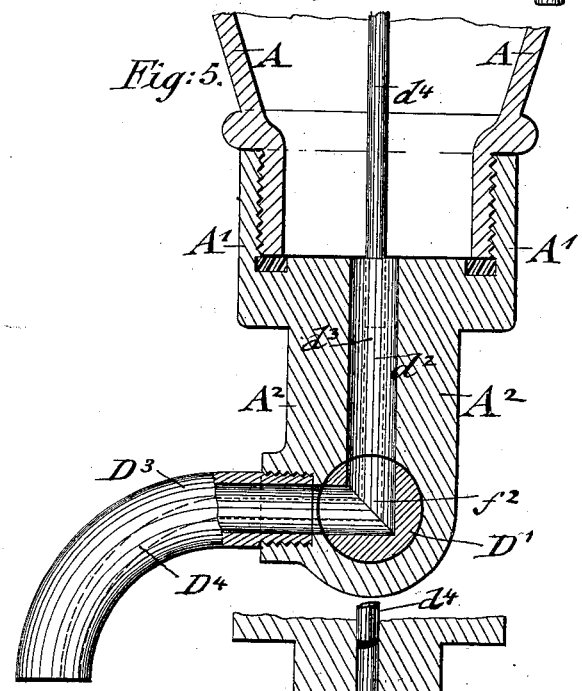
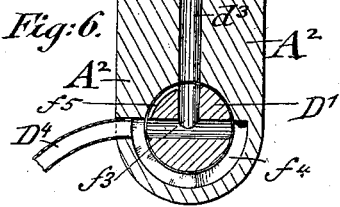
WITNESSES:
M. H. Wurtzel
George Geibel.
INVENTOR
John Nageldinger
BY
ATTORNEYS.

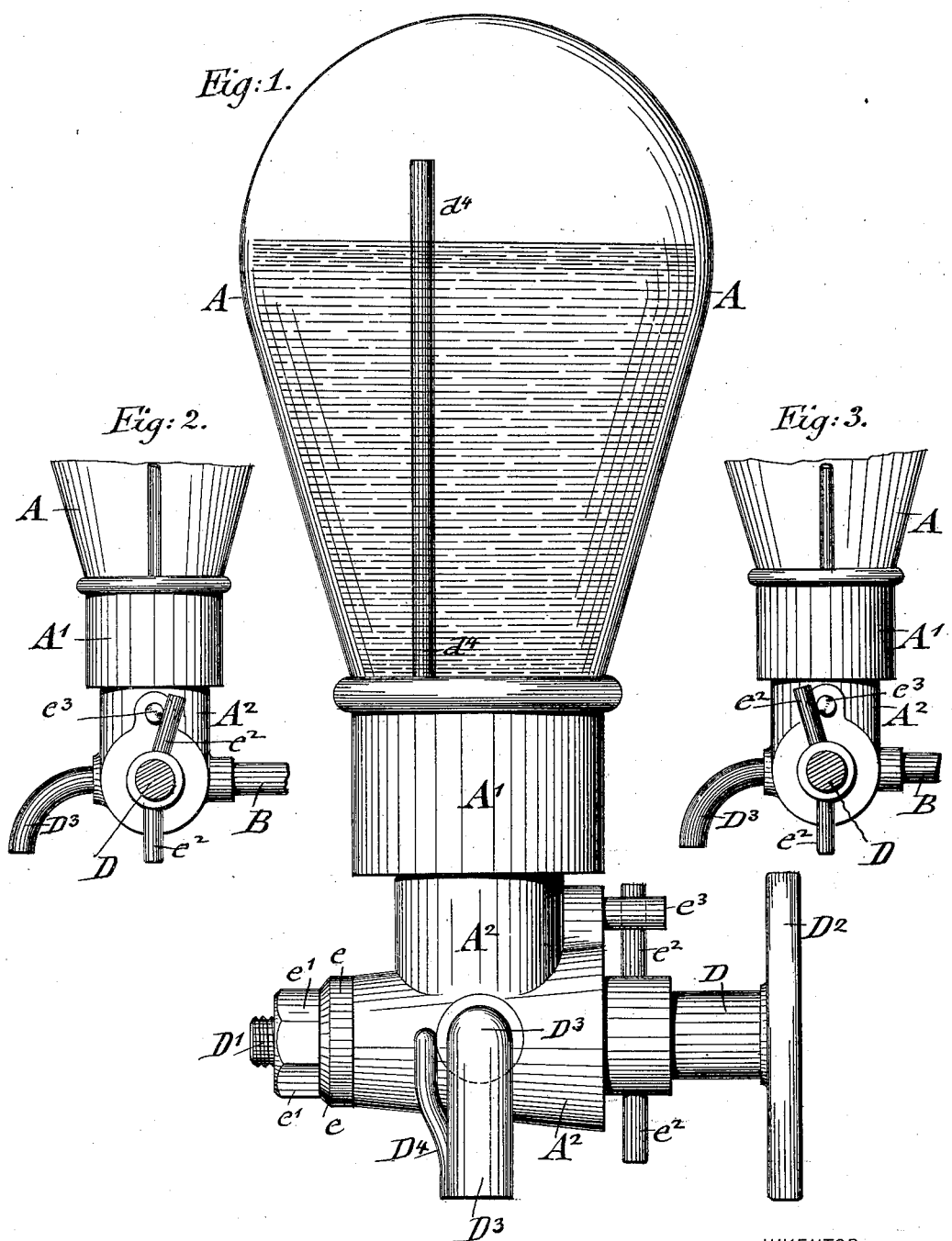

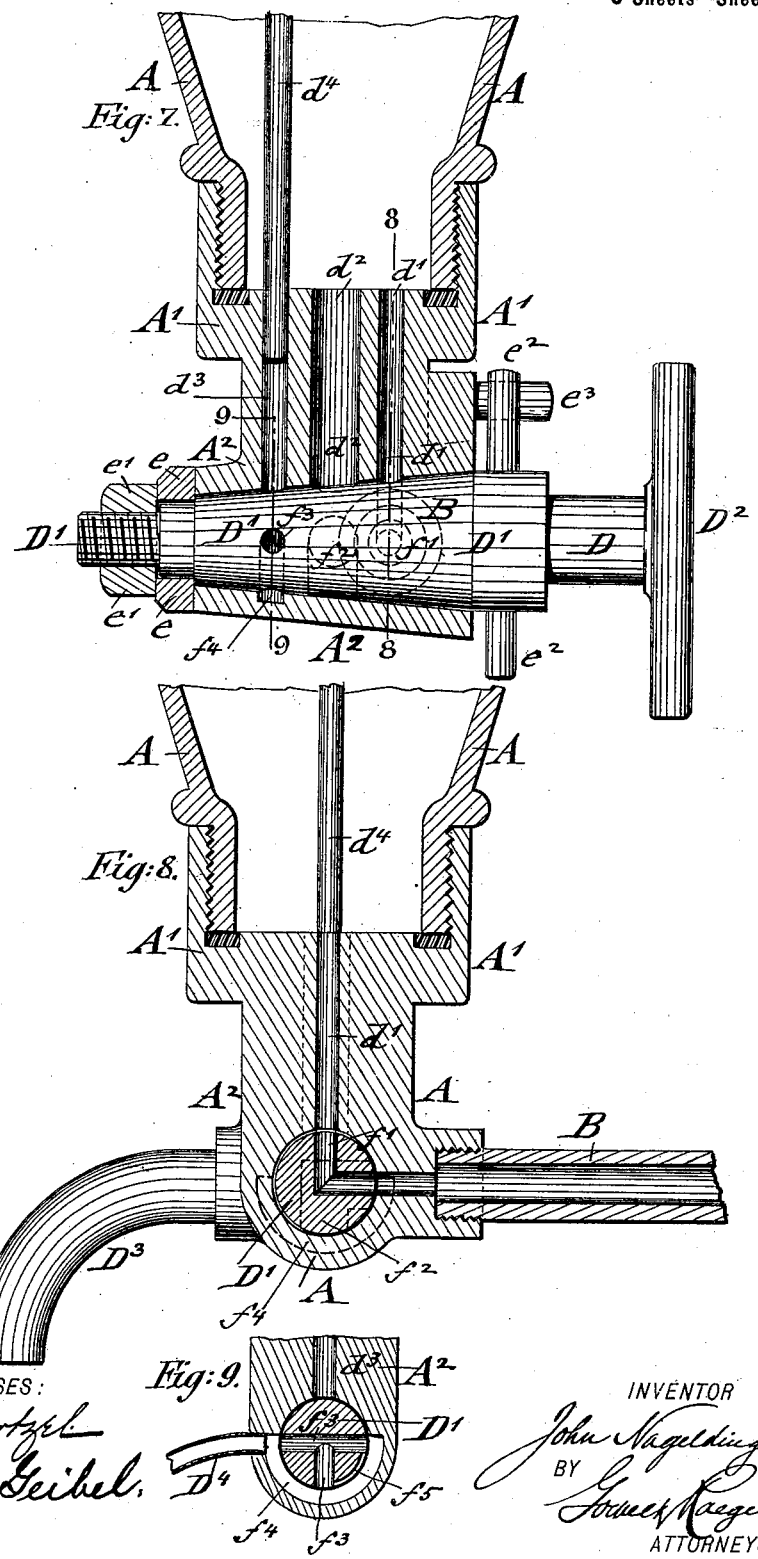

UNITED STATES PATENT OFFICE.

JOHN NAGELDINGER, OF NEW YORK, N. Y.

APPARATUS FOR DRAWING EFFERVESCENT LIQUIDS.

SPECIFICATION forming part of Letters Patent No. 660,164, dated October 23, 1900.

Application filed March 1, 1899. Serial No. 707,487. (No model.)

*To all whom it may concern:*

Be it known that I, JOHN NAGELDINGER, a citizen of the United States, residing at New York, borough of Manhattan, State of New York, have invented certain new and useful Improvements in Apparatus for Drawing Effervescent Liquids, of which the following is a specification.

This invention relates to improvements in apparatus for drawing off liquids which are retained under pressure without the excessive foaming which occurs when the liquid is drawn off directly under full pressure of the fountain.

The object of the invention is to provide such an apparatus of cheap and simple construction which is capable of being easily and quickly operated and which is adapted for drawing off carbonated beverages.

The invention consists of an apparatus for drawing off effervescent liquids comprising a pressure-relieving chamber, a socket for supporting said chamber, said socket being provided with a supply-channel, a discharge-channel, and a pressure-relieving channel, a gas-escape pipe in the pressure-relieving chamber connected with the pressure-relieving channel of the socket, a stop-cock below said socket composed of a casing and a spigot, said casing being provided with a supply-pipe, a main spout, and an auxiliary spout and the spigot with a supply-channel, a discharge-channel, and a T-shaped pressure-relieving channel, said channels serving to connect successively the supply-pipe with the pressure-relieving chamber and the latter with the main and auxiliary spouts, said casing being further provided with an interior semicircular groove opposite the pressure-relieving channel of the spigot and the spigot with a quadrantal groove connecting two adjacent ends of its T-shaped channel and stop-pins on said socket and spigot for arresting the latter after making a half-turn in either direction.

In the accompanying drawings, Figure 1 represents a front elevation of my improved apparatus for drawing effervescent liquids. Figs. 2 and 3 are side elevations of my improved stop-cock by which the different connections of the pressure-relieving chamber with the fountain and discharge-spout are produced. Fig. 4 is a detail vertical longitudinal section through the stop-cock, showing it in position for discharging the liquid from the pressure-relieving chamber. Figs. 5 and 6 are vertical transverse sections through the stop-cock on lines 5 5 and 6 6, Fig. 4, showing it in position for discharging the liquid from the chamber. Fig. 7 is a vertical longitudinal section through the stop-cock, showing it in position for supplying effervescent liquid from the fountain to the pressure-relieving chamber; and Figs. 8 and 9 are vertical transverse sections through the stop-cock respectively on lines 8 8 and 9 9, Fig. 7.

Similar letters of reference indicate corresponding parts.

Referring to the drawings, A represents a pressure-relieving chamber, which is preferably made of glass of suitable thickness, so as to resist the pressure of the effervescent liquid that is to be drawn off from the same. The neck of the pressure-relieving chamber A is screwed into a socket $A'$, said socket being supported by a suitable pipe B, that is connected with the vessel or fountain containing the effervescent liquid under pressure. A casing $A^2$ is arranged at the lower part of the socket $A'$ and preferably cast in one piece with the same. In the socket $A'$ are arranged three vertical channels $d'\ d^2\ d^3$, which communicate, respectively, with rectangular channels $f'\ f^2\ f^3$ in the spigot $D'$ of the stop-cock D. The middle portion of the spigot $D'$ is made conically tapering and fitted tightly into the casing $A^2$ and retained therein by a collar $e$, placed on a shoulder of the spigot, and a screw-nut $e'$, screwed over the threaded end of the spigot. The opposite thicker end of the spigot $D'$ is provided with a handle $D^2$ for permitting the turning of the spigot in its casing. In the thicker end of the spigot $D'$, near the handle, are arranged two stop-pins $e^2$, that are nearly diametrically opposite each other on the spigot, said stop-pins being adapted to abut against a stationary pin $e^3$ on the outside of the socket $A'$.

The rectangular channel $f'$ of the spigot $D'$ is located in the same vertical plane as the channel $d'$ of the socket $A'$ and equal in diameter with said channel and the exterior diameter of the supply-pipe B. The second rectangular channel $f^2$ is arranged in the spigot D' in the same vertical plane with the channel $d^2$ of the socket A' and a discharge-spout $D^3$, which is screwed into the front part of the casing $A^2$, as shown clearly in Figs. 1 and 5. The third channel $f^3$ is arranged in the spigot in a vertical plane with the channel $d^3$ of the socket A' and formed of a diametrical channel and a radial channel at right angles thereto, as shown in Figs. 6 and 9. This T-shaped channel $f^3$ serves to connect the channel $d^3$ with a smaller auxiliary spout $D^4$, which is located sidewise of the main spout $D^3$ at the front part of the valve-casing, as shown in Fig. 1. The channel $d^3$ is connected at its upper end with a vertical escape-pipe $d^4$, which extends to a suitable height into the pressure-relieving chamber A. The casing $A^2$ of the stop-cock D is provided with an interior semicircular groove $f^4$, which extends from the inner end of the auxiliary spout $D^4$ to the rear part of the casing $A^2$, as shown in Figs. 6 and 9. The spigot D' is further provided with a quadrantal groove $f^5$, which connects two adjacent openings of its diametrical and radial channels with each other. The channels $f'$ $f^2$ $f^3$ in the spigot are so arranged relatively with each other, with the supply-pipe B, and with the channels in the socket A' leading to the pressure-relieving chamber that by turning the spigot first in one direction and then back again to its former or normal position all the connections required for supplying the pressure-relieving chamber with effervescent liquid, permitting the escape of gas from the chamber to the atmosphere, letting in the air into the chamber, and then drawing off the liquid under atmospheric pressure from the chamber are produced.

The operation of my improved apparatus for drawing effervescent liquids is as follows: The spigot of the stop-cock D is turned from its normal position (shown in Fig. 2) into the position shown in Fig. 3—that is to say, through an angle of nearly one hundred and eighty degrees—so that the second pin $e^2$ strikes against the stop-pin $e^3$ on the socket A'. This brings the angular channel $f'$ of the spigot in communication with the supply-pipe B and with the channel $d'$, leading to the pressure-relieving chamber A. The angular channel $f^2$ is then in the position shown in dotted lines in Fig. 8, so as to shut off the communication of the pressure-relieving chamber with the main spout $D^3$. The channel $f^3$ is likewise disconnected from the auxiliary spout $D^4$, as shown in Fig. 9. The result is that the pressure-relieving chamber is filled with liquid under pressure, while the air in the chamber is compressed by the liquid rising in the chamber until an equilibrium of pressure in the fountain and in the pressure-relieving chamber is established. As soon as the pressure-relieving chamber is filled to this extent the spigot is turned by its handle in the opposite or return direction through an angle of one hundred and eighty degrees until the first pin $e^2$ abuts again against the stop-pin $e^3$. During this motion the communication of the channel $f'$ with the supply-pipe B is interrupted and the auxiliary spout $D^4$ placed by the T-shaped channel $f^3$ in connection with the channel $d^3$ and the vertical tube $d^4$, leading to the upper part of the pressure-relieving chamber, so that the compressed air and gas in the same are permitted to escape. By continuing the return motion of the spigot the quadrantal groove of the channel $f^3$ of the spigot D' moves along the semicircular groove of the valve-casing and permits the free escape of the compressed air and gas and the ingress of air until atmospheric pressure is established above the liquid in the pressure-relieving chamber, so that when the pin $e^2$ of the spigot arrives at the stop-pin $e^3$, in the position shown in Fig. 2, the connection of the pressure-relieving vessel A is established with the main spout D by the vertical channel $d^2$ of the socket A' and channel $f^2$, and thereby the discharge of the effervescent liquid from the pressure-relieving chamber by gravity at atmospheric pressure permitted. During the drawing off of the effervescent liquid from the pressure-relieving chamber the air is permitted to pass in through the auxiliary spout $D^4$, angular channel $f^3$, vertical channel $d^3$, and escape-pipe $d^4$, so that the required vent is given to the interior of the pressure-relieving chamber, and thereby the free drawing off of the effervescent liquid into a tumbler or other vessel obtained. The object of the semicircular groove in the valve-casing and of the quadrantal groove in the spigot is to establish a permanent connection with the inside of the pressure-relieving chamber and the atmosphere from the moment of relieving the chamber from pressure until the liquid is drawn, so that the gas may pass out and air go in, as required. As soon as the spigot is turned the connection of the pressure-relieving chamber A with the supply-pipe B is interrupted and in place thereof the connection with the auxiliary spout $D^4$ established, the pressure of the air and gas in the pressure-relieving chamber being first relieved and, next, the connection of the interior of the pressure-relieving chamber with the atmosphere established. When it is desired to interrupt the discharge of the effervescent liquid from the pressure-relieving chamber, the valve-spigot is turned into an intermediate position, so that liquid can neither be supplied from the supply-pipe to the pressure-relieving chamber nor discharged from said chamber through the spout. The operations of supplying the pressure-relieving chamber with effervescent liquid and of discharging the same from the pressure-relieving chamber are thus accomplished by two turning motions of the stop-cock, the first motion (starting from the intermediate position referred to) serving for charging the pressure-relieving chamber with effervescent liquid and the second or return motion serving for disconnecting the pressure-relieving chamber from the supply-pipe and connecting it with the atmosphere and then also with the discharge-spout.

The simplicity of operation permits the handling of the apparatus by any one, so that the same can be used in connection with the ordinary fountains in which carbonated liquids are supplied, so that the excessive foaming which takes place, especially with root-beer, sarsaparilla, or similar liquids, is obviated and still a greater percentage of carbonic-acid gas retained in the liquid, for the simple reason that the liquid is first transferred into the pressure-relieving chamber under pressure, next relieved from pressure while in the same, and, lastly, drawn off under atmospheric pressure.

When the apparatus is to be used for the dispensing of effervescent liquids in connection with suitable fruit-syrups, it is preferable to make the vertical escape-tube in the pressure-relieving chamber of somewhat less height, so that a small quantity of liquid under pressure may be discharged into the tumbler and mixed with the syrup before the main portion of effervescent liquid is mixed therewith.

My improved apparatus can also be used for dispensing malt liquors when the same are drawn off under pressure of carbonic-acid gas or air-pressure, in which case the supply-pipe is connected in a suitable manner with the shipping vessel containing said malt liquor.

Having thus described my invention, I claim as new and desire to secure by Letters Patent—

An apparatus for drawing off effervescent liquids, consisting of a pressure-relieving chamber, a socket for supporting said chamber, said socket being provided with a supply-channel, a discharge-channel and a pressure-relieving channel, a gas-escape pipe in the pressure-relieving chamber connected with the pressure-relieving channel of the socket, a stop-cock below said socket, composed of a casing and a spigot, said casing being provided with a supply-pipe, a main spout and an auxiliary spout and the spigot with a supply-channel, a discharge-channel and a T-shaped pressure-relieving channel, said channel serving to connect successively the supply-pipe with the pressure-relieving chamber and the latter with the main and auxiliary spouts, said casing being further provided with an interior semicircular groove opposite the pressure-relieving channel of the spigot, and the spigot with a quadrantal groove connecting two adjacent ends of its T-shaped channel, and stop-pins on said socket and spigot for arresting the latter after making a half-turn in either direction, substantially as set forth.

In testimony that I claim the foregoing as my invention I have signed my name in presence of two subscribing witnesses.

JOHN NAGELDINGER.

Witnesses:
PAUL GOEPEL,
M. H. WURTZEL.